(12) United States Patent
Kartoun

(10) Patent No.: US 9,558,294 B2
(45) Date of Patent: Jan. 31, 2017

(54) ASYNCHRONOUS CACHING TO IMPROVE USER EXPERIENCE

(75) Inventor: Uri Kartoun, Washington, DC (US)

(73) Assignee: MICROSOFT TECHNOLOGY LICNESING, LLC, Redmond, WA (US)

(*) Notice: Subject to any disclaimer, the term of this patent is extended or adjusted under 35 U.S.C. 154(b) by 166 days.

(21) Appl. No.: 13/368,349

(22) Filed: Feb. 8, 2012

(65) Prior Publication Data
US 2013/0204857 A1    Aug. 8, 2013

(51) Int. Cl.
*G06F 17/30* (2006.01)

(52) U.S. Cl.
CPC .................. *G06F 17/30943* (2013.01)

(58) Field of Classification Search
USPC .................. 707/748, 602, 7, 2, 10
See application file for complete search history.

(56) References Cited

U.S. PATENT DOCUMENTS

| | | | |
|---|---|---|---|
| 7,440,968 B1* | 10/2008 | Oztekin | G06F 17/30864 |
| 7,630,976 B2 | 12/2009 | Zhang et al. | |
| 7,827,170 B1 | 11/2010 | Horling et al. | |
| 7,945,566 B2* | 5/2011 | James | G06F 17/3053 707/723 |
| 8,069,406 B2* | 11/2011 | Weiss et al. | 715/208 |
| 8,296,360 B2* | 10/2012 | Polis et al. | 709/203 |
| 2002/0002571 A1* | 1/2002 | Manohar et al. | 707/526 |
| 2006/0069617 A1* | 3/2006 | Milener | G06F 17/30902 705/14.69 |
| 2007/0011613 A1* | 1/2007 | Lane | G06F 8/73 715/709 |
| 2009/0259632 A1* | 10/2009 | Singh | 707/3 |
| 2010/0057714 A1 | 3/2010 | Miedema | |
| 2010/0082610 A1* | 4/2010 | Anick et al. | 707/723 |
| 2010/0191582 A1* | 7/2010 | Dicker et al. | 705/10 |
| 2011/0066607 A1* | 3/2011 | Wong | G06F 17/3053 707/706 |
| 2011/0173569 A1* | 7/2011 | Howes et al. | 715/835 |
| 2011/0225139 A1* | 9/2011 | Wang et al. | 707/709 |
| 2012/0144325 A1* | 6/2012 | Mital et al. | 715/763 |

OTHER PUBLICATIONS

"Background Intelligent Transfer Service", Retrieved at <<http://en.wikipedia.org/wiki/Background_Intelligent_Transfer_Service>>, Jan. 11, 2012, pp. 5.

"Peer Caching", Retrieved at <<http://msdn.microsoft.com/en-us/library/windows/desktop/aa964314(v=vs.85).aspx>>, Jan. 11, 2012, pp. 3.

(Continued)

*Primary Examiner* — Tyler Torgrimson
(74) *Attorney, Agent, or Firm* — Thomas Marquis; Kate Drakos; Micky Minhas

(57) ABSTRACT

A request for information is received, and results corresponding to the request are obtained. The results are provided to a ranking module that ranks them based on user-specific and environmental-specific ranking characteristics in order of how likely they are to be selected by the user in response to the user's request. Before the user selects one of the results, an asynchronous caching component caches the top ranked results so that if they are selected by the user they can quickly be retrieved from cache.

20 Claims, 16 Drawing Sheets

(56) References Cited

OTHER PUBLICATIONS

Padmanabhan, et al., "Using Predictive Prefetching to Improve World Wide Web Latency", Retrieved at <<http://maya.cs.depaul.edu/~mobasher/research/bib/bib-papers/PM96.pdf>>, ACM SIGCOMM Computer Communication Review, vol. 26, Issue 3, Jul. 1996, pp. 22-36.

Chen, et al. "Analyzing and Accelerating Web Access in a School in Peri-Urban India", Retrieved at <<http://citeseerx.ist.psu.edu/viewdoc/dlownload?doi=10.1.1.188.6542&rep=rep1&type=pdf>>, Proceedings of the 20th international conference companion on World Wide Web, Mar. 28-Apr. 1, 2011, pp. 443-452.

Qiu, et al., "Automatic Identification of User Interest For Personalized Search", Retrieved at <<http://citeseerx.ist.psu.ede/viewdoc/download?doi=10.1.1.79.255&rep=rep1&type=pdf>>, Proceedings of the 15th international conference on World Wide Web, May 23-26, 2006, pp. 727-736.

Speretta, Mirco, "Personalizing Search Based on User Search Histories", Retrieved at <<http://ieeexplore.ieee.org/stamp/stamp.jsp?tp=&arnumber=1517922>>, The 2005 IEEE/WIC/ACM International Conference on Web Intelligence, Sep. 19-22, 2005, pp. 622-628.

\* cited by examiner

ASYNCHRONOUS CACHING TO IMPROVE USER EXPERIENCE

BACKGROUND

Many different types of computer programs allow a user to request data, and in response, return results that have links to additional information. For instance, when a web browsing application allows a user to browse a wide area network (such as the Internet) and follow hyperlinks When the user clicks on a hyperlink, the browser loads the page or document associated with that hyperlink so that it can be viewed by the user.

Search engine applications allow a user to search for information by inputting a query as a series of keywords. The search engine then searches one or more different data stores for documents, webpages, or other results that correspond to the keywords. The search engine often returns, on a results page, a list of hyperlinks that link to the underlying result documents. The underlying result documents can be webpages, word processing documents, or other types of underlying documents. Again, when the user clicks on one of those links on the results page, the search engine downloads the underlying document so that it can be viewed, or operated on, by the user.

Other types of programs do similar things as well. For instance, enterprise resources planning (ERP) and customer relations management (CRM) applications allow users to search for and manipulate business data. By way of example, a user can specify search parameters to identify certain kinds of customers that have certain sales tendencies during certain times of the year. These parameters are used by the ERP/CRM system to search for customer account entities or records that satisfy the search criteria. A list of those account entities is often returned to the user, by way of hyperlinks or other reporting, and the user can click on hyperlinks or portions of the report to get further detail, or to look at other aspects of the search results. When the user clicks on one of the hyperlinks, or selects a portion of data for more detailed viewing, the ERP/CRM program downloads those records and displays them to the user so that the user can view or operate on those records as well.

In each of these scenarios, it can happen that it takes the program an undesirably long time to download a selected results document. For instance, when the user is presented with a list of hyperlinks to underlying documents, and the user clicks on one of those hyperlinks, it can take the program an undesirable amount of time to download the underlying document so that it can be viewed and operated on by the user. This can have a negative impact on user experience. It is likely that a user who needs to wait longer encounters frustration, and a user experience that is less pleasant, than a user who does not need to wait a long time for the underlying source document to download.

In addition, if the user spends a relatively large amount of time performing these types of operations, the waiting times for source documents to download can accumulate quickly and result in a significant waste of time. For instance, such wait times can accumulate to hundreds of minutes per month. In those cases, instead of being exposed to the underlying documents (or to related advertisements generated by the program) the user is often in an idle state, simply waiting for the underlying data to be downloaded. Neither the user nor the company that provides the program and its corresponding hyperlinks benefit from such a situation. This problem can be greatly exacerbated in certain regional territories where high speed network service is unavailable.

The discussion above is merely provided for general background information and is not intended to be used as an aid in determining the scope of the claimed subject matter.

SUMMARY

A request for information is received, and results corresponding to the request are obtained. The results are provided to a ranking module that ranks them based on user-specific ranking characteristics in order of how likely they are to be selected by the user in response to the user's request. Before the user selects one of the results, an asynchronous caching component caches the top ranked results so that if they are selected by the user they can quickly be retrieved from cache.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
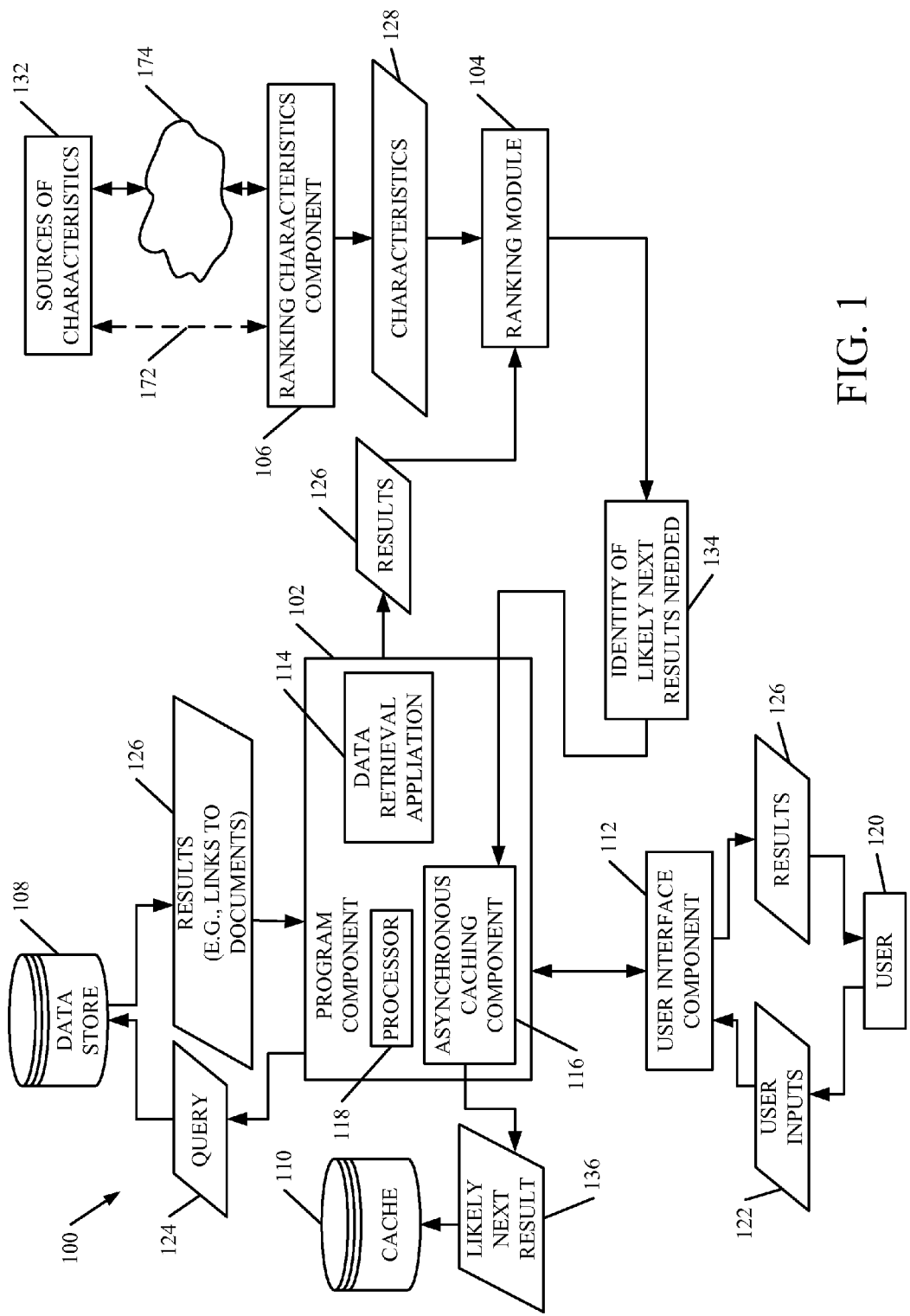
FIG. 1 is a block diagram of one embodiment of a data retrieval system.

FIG. 1 is a block diagram of one embodiment of a data retrieval system 100. System 100 includes program component 102, and ranking module 104. The system in FIG. 1 is also shown with ranking characteristics component 106, data store 108, cache 110 and user interface component 112. Program component 102 illustratively runs a data retrieval application 114 and includes asynchronous caching component 116 and processor 118. Processor 118 is illustratively a computer processor with associated timing and memory circuitry (not shown). Processor 118 is illustratively a functional component of system 100 and is activated by, and facilitates the functionality of, components in system 100.

A detailed discussion of the operation of system 100 is described below with respect to FIGS. 2A and 2B. Briefly, however, a user 120 illustratively provides a user input in the form of a query or data request 122, through user interface component 112. User interface component 112 provides the user inputs 122 to program component 102. Data retrieval application 114 provides the user inputs, as query 124, to data store 108 in order to obtain results 126. The results illustratively include links to webpages or other underlying source documents. Program component 102 provides the results 126 to ranking module 104. Ranking module 104 sorts the results 126 characteristics 128 of user 120, as well as other characteristics (retrieved by ranking characteristics component 106 from various sources of characteristics 132), and provides sorted results 134 which identify, by their order, which of the links are likely to be next clicked on by user 120. Asynchronous caching component 116 caches the underlying source documents from data store 108 for the most likely links identified as sorted results 134. The underlying source documents for the most likely links are identified as likely next results 136, and they are stored by asynchronous caching component 116 in cache 110. In one embodiment, data retrieval application 114 generates a results page showing results 126 (e.g., showing links to the underlying documents) to the user through user interface component 112. While the user is reviewing results 126, and before the user has clicked on any of the results, asynchronous caching component 116 runs in the background and caches the most likely source documents corresponding to the links that the user is most likely to select from results 126. When the user does actuate one of the most likely links, the source document has already been downloaded to cache 110 and can quickly be displayed for user 120.

Figure 2A:
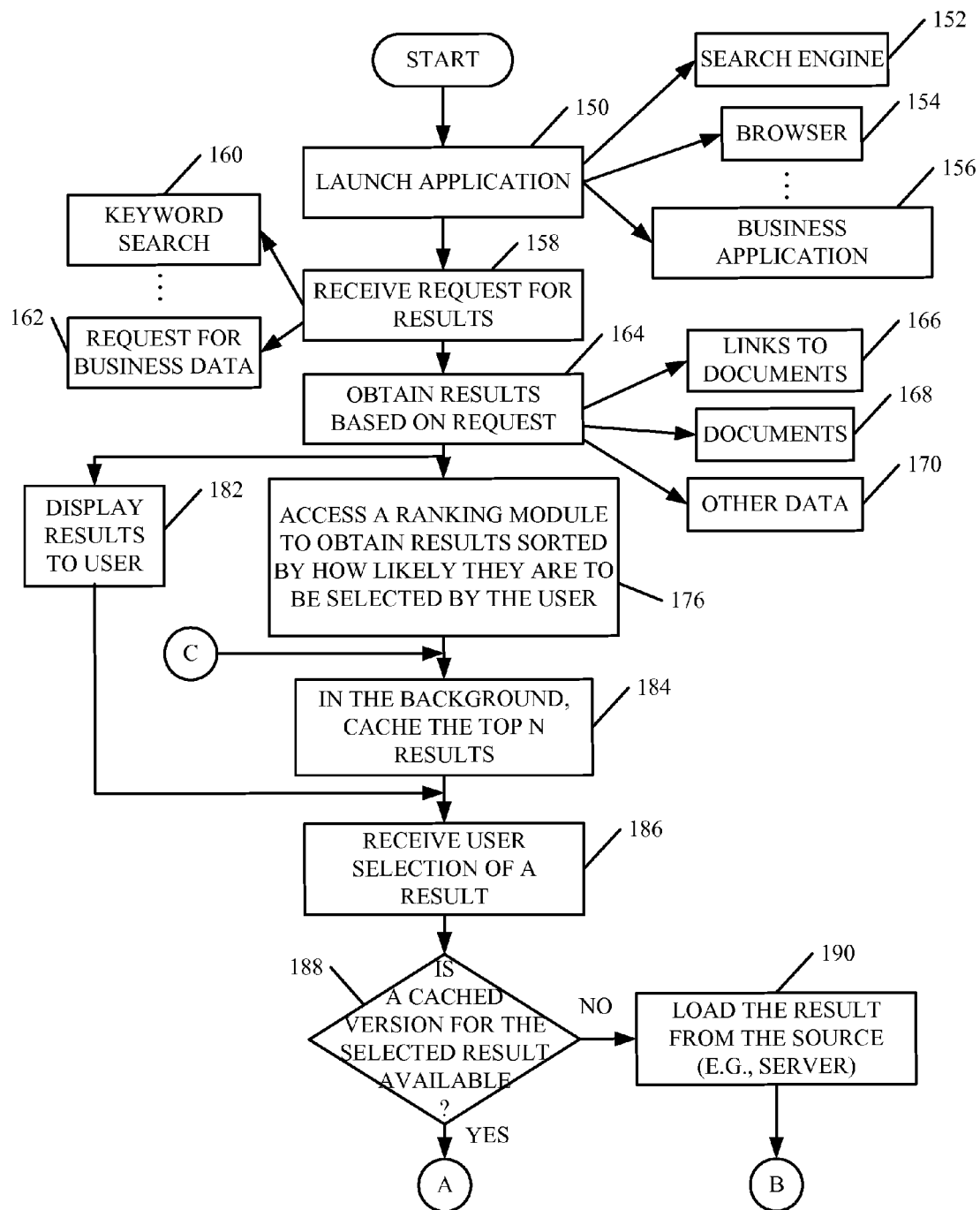
FIGS. 2A and 2B illustrate a flow diagram showing one embodiment of the operation of the system shown in FIG. 1.
Figure 2B:
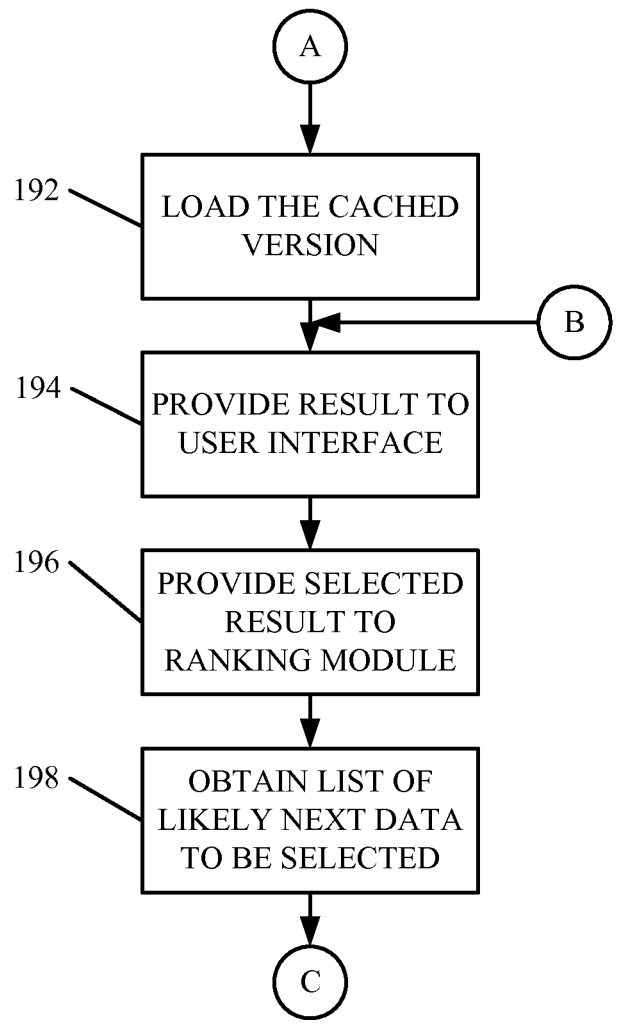

FIGS. 2A and 2B are a flow diagram illustrating the operation of system 100 in more detail. User 120 first provides user inputs 122 through user interface component 112 to launch data retrieval application 114. This is indicated by block 150 in FIG. 2A. User interface component 112 is illustratively a component that can be deployed on a user device to generate user interface displays that have user input mechanisms that allow user 120 to interact with the program 114, through those user input mechanisms. The input mechanisms can include, for example, text entry boxes, radio buttons, dropdown menus, hyperlinks or any other of a wide variety of different types of user input mechanisms. In addition, the device which user 120 interacts with can be any of a wide variety of different types of devices, such as a desktop computer, a laptop computer, a tablet computer, a smart phone, cellular telephone, personal digital assistant, multi-media player, etc. Some of these embodiments are described below with respect to FIGS. 6-10. In one embodiment, the user device includes a touch sensitive screen. In that case, user 120 can provide user inputs 122 as touch gestures on the touch sensitive screen. Of course, the user input mechanisms can receive user inputs 122 in other ways as well, such as from a point and click device, voice, a keyboard, stylus, camera or other sensing input devices or in other ways.

In any case, the data retrieval application 114 can be any of a wide variety of different types of applications. In one embodiment, data retrieval application 114 is a search engine 152, a browser 154, or a business application 156, but it can be other types of applications as well. Where application 114 is a search engine 150, user 120 provides user inputs 122 in the form of a search query, such as a keyword query, or another type of search engine input. Where application 114 is a browser 154, the user inputs 122 are provided as browser inputs, such as clicking navigation buttons or hyperlinks, such as inputting a web address or searching for webpages. Where application 114 is a business application 156, the user can provide inputs 122 to the business application to define search criteria for searching for business data, such as customer accounts, sales data, reporting data, sales prospects, regional sales or marketing reports, etc. The business application 156 returns business data records corresponding to the search criteria input by the user.

In any of these cases, data retrieval application 114 illustratively receives a request for results from the user, as user inputs 122. This is indicated by block 158 in FIG. 2A. As discussed above, the request can be a keyword search 160, a request for business data 162, or other user inputs.

Figure 2D:
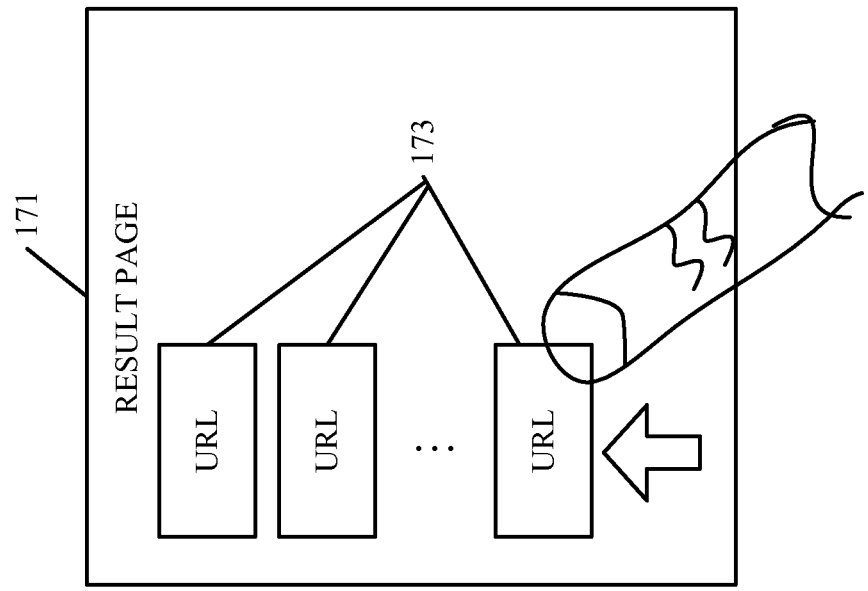
FIGS. 2C-2F show exemplary user interface displays.
Figure 2C:
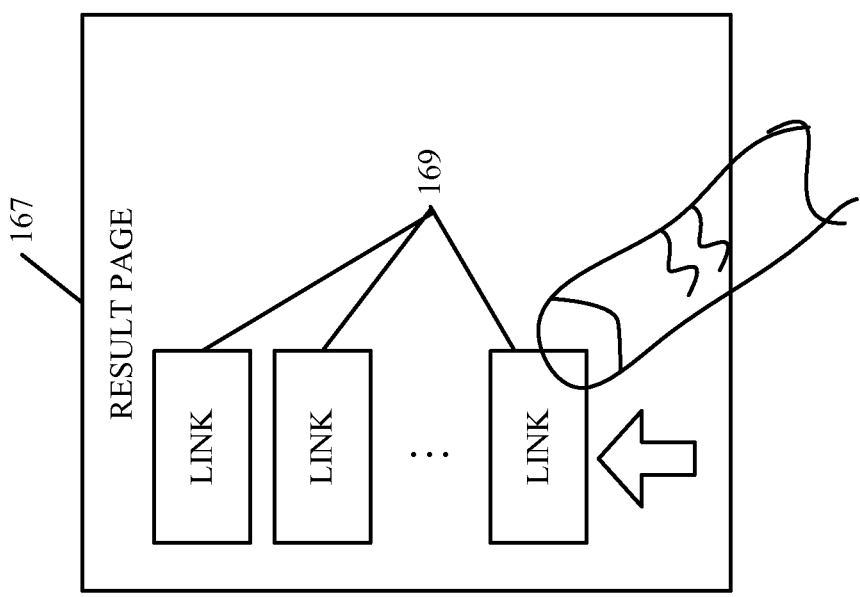

Data retrieval application 114 then retrieves results based on the request. This is indicated by block 164 in FIG. 2A. The results can take a wide variety of different forms as well. For instance, when application 114 is a search engine 150 or browser 154, the query is provided to data store 108 and the results are returned as a set of links to underlying documents or webpages. This is indicated by block 166 in FIG. 2A. FIG. 2C shows one embodiment of a user interface display 167. Display 167 shows a results page with links 169 to underlying documents. The links can be actuated by a point and click device or a touch gesture (from a finger or stylus, for example) or otherwise. FIG. 2D shows one embodiment of a user interface display 171. Display 171 shows a list of links 173 to webpages which can be activated with a point and click device, a touch gesture or otherwise.

Figure 2E:
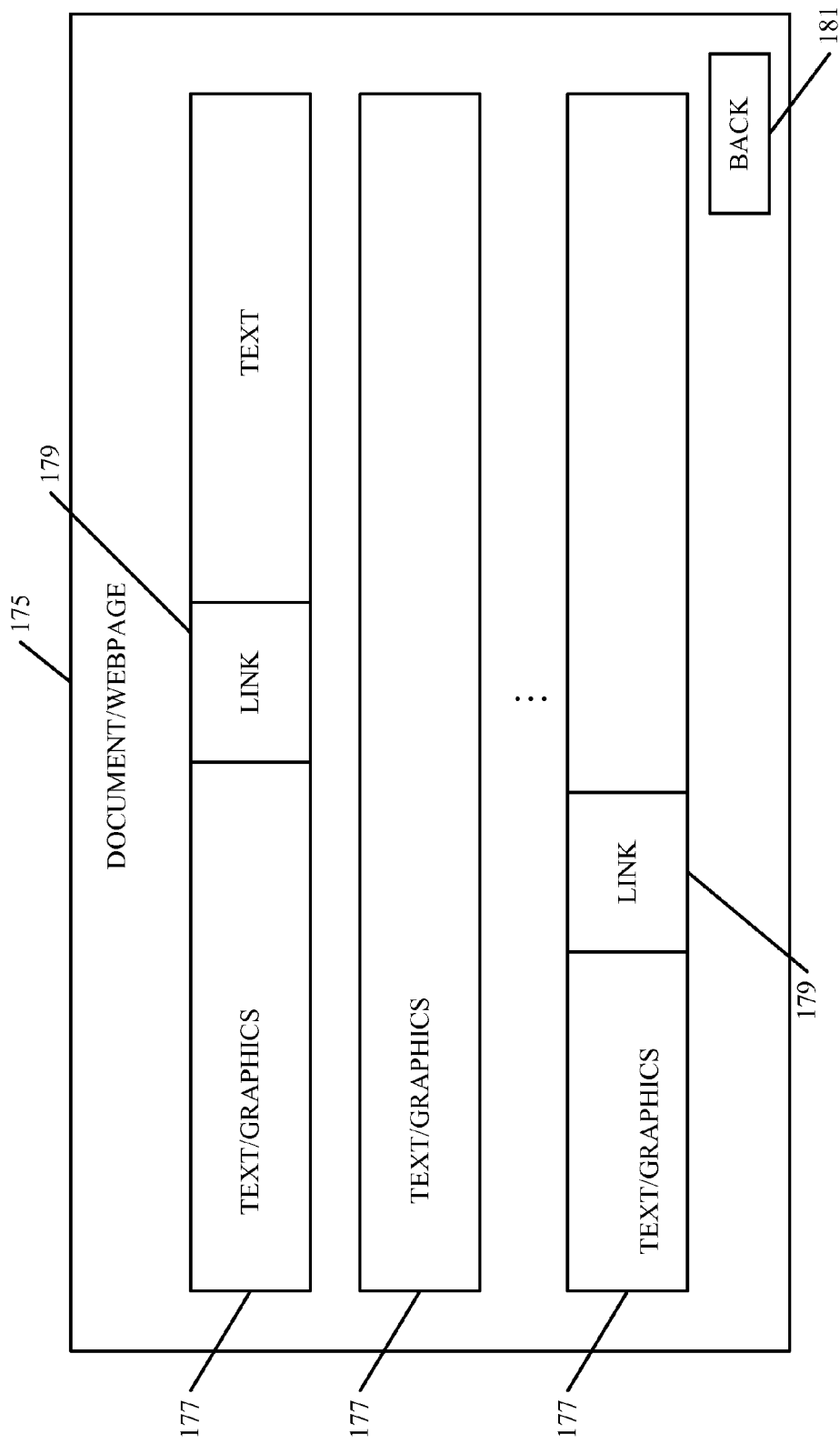

Of course, the search results can also be returned as documents 168, with embedded links therein. For instance, if the application returns an encyclopedia webpage, the encyclopedia webpage may have additional hyperlinks embedded within the text of the webpage. This type of underlying document with embedded links, is indicated by block 168 in FIG. 2A. FIG. 2E shows one embodiment of a user interface display 175. Display 175 shows a document with text or graphics 177 with embedded links 179 which can be actuated with a point and click, a touch gesture or otherwise.

Figure 2F:
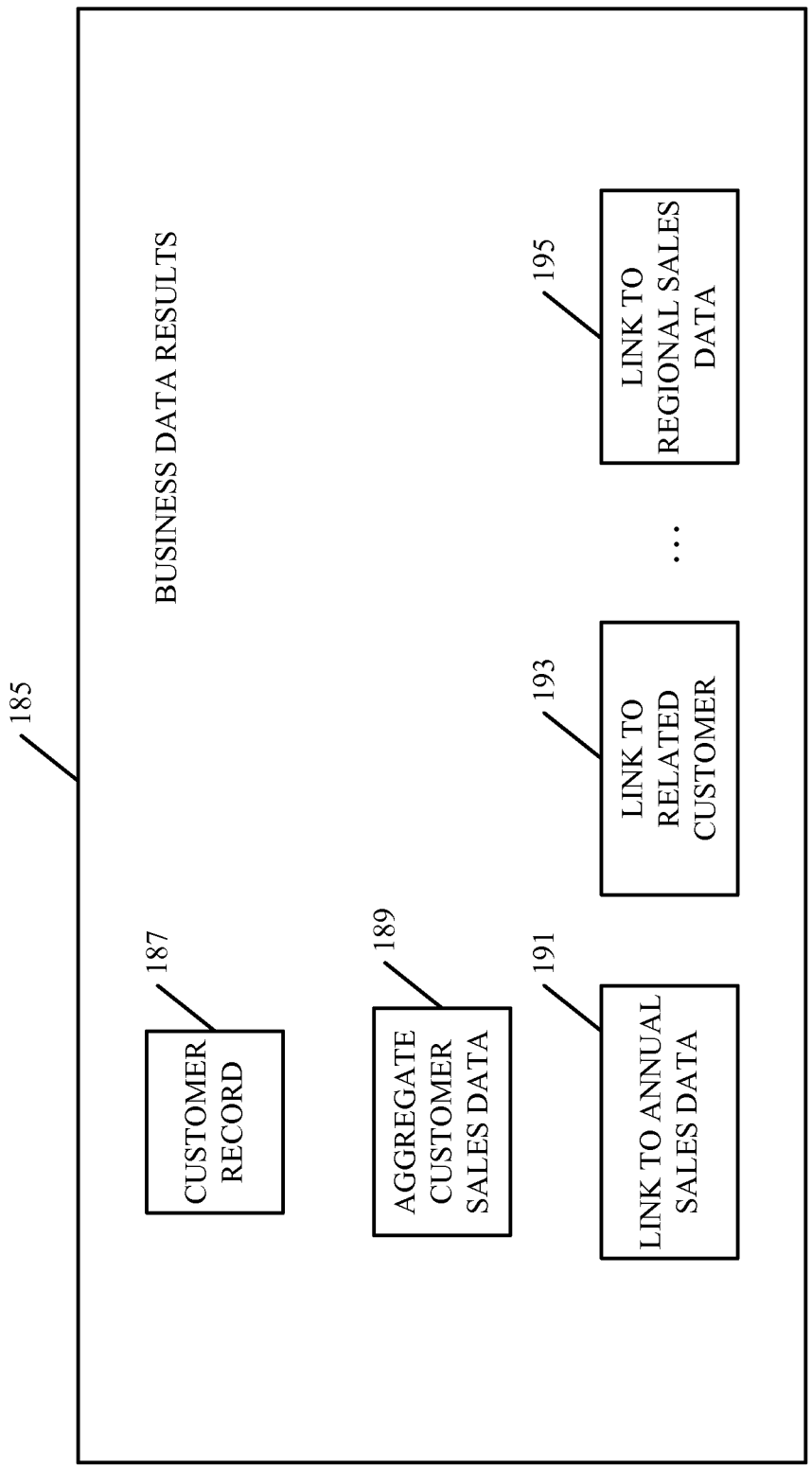

The data returned can be business data or any other type of data 170. FIG. 2F shows one embodiment of a user interface display 185. Display 185 shows business data with customer records 187 aggregate customer sales data 189 and a set of links 191, 193 and 195 that can be actuated to retrieve other data, such as annual sales data, related customer records and regional sales data.

As results 126 are being sent to user interface component 112 for display to user 120, program component 102 then sends the results 126 to ranking module 104. Ranking module 104 ranks actionable links or buttons in the results 126 in order of how likely they will be selected for more detailed viewing by the user, based on characteristics 128 received from ranking characteristics component 106. Ranking characteristics component 106 retrieves the ranking characteristics from a variety of different sources of characteristics 132. The ranking characteristics component 106 can do this by being directly connected to the sources 132, as indicated by arrow 172, or through a network 174, or otherwise. A more detailed discussion of the different sources of characteristics that can be obtained by ranking characteristics component 106 and used by ranking module 104 is described below with respect to FIG. 3. Briefly, however, the characteristics can be personal characteristics of user 120, such as the user's identity, gender, interests, social network data, etc. They can also include the recent browsing characteristics of user 120, characteristics extracted from cookies associated with user 120, or other types of characteristics.

In any case, program component 102 accesses ranking module 104 to obtain results 134 sorted by how likely they are to be selected by the user. This is indicated by block 176 in FIG. 2A. This can be performed, in one embodiment, by ranking characteristics component 106 obtaining the ranking characteristics 128 from sources 132 and providing them to ranking module 104. This is indicated by block 178 in FIG. 2A. Ranking module 104 then sorts results 126 into sorted results 134 based on the ranking characteristics 128. This is indicated by block 180 in FIG. 2A.

Ranking module 104 can be relatively simple. It can derive keywords from sources 132 as characteristics 128 and compare them with words in results 126. Ranking module 104 can also, of course, be more complex, such as a machine learning natural language parser and statistical classifier. Other embodiments for ranking module 104 are contemplated as well.

In one embodiment, at the same time that ranking module 104 is being accessed to rank results 126, data retrieval application 114, is also displaying results 126 to user 120 through user interface component 112. This is indicated by block 182 in FIG. 2A.

While the user is viewing results 126, but before the user has actually selected one of the results, asynchronous caching component 116 begins caching the results that the user is most likely to click on, as identified by sorted results 134. In the embodiments shown in FIG. 2A, asynchronous caching component 116 caches the top N most likely results 136 in cache 110. This is indicated by block 184 in FIG. 2A. The number N can be determined empirically or otherwise.

More specifically, the identity of the likely results 134 may illustratively be a sorted list of hyperlinks, that correspond to results 126. Asynchronous caching component 116 illustratively caches the underlying documents corresponding to the top N most likely results to be selected by the user. These likely results are retrieved from data store 108 as likely next results 136 and cached in cache 110.

At some point, user 120 will provide a user input 122, through user interface component 112, selecting one of the results 126. Receiving this selection is indicated by block 186 in FIG. 2A. Data retrieval application 114 then determines whether the selected result has already been downloaded into cache 110. This is indicated by block 188 in FIG. 2A. If not, then data retrieval application 114 simply downloads the source document corresponding to the selected result from the source of the data (e.g., data store 108). This is indicated by block 190 in FIG. 2A.

However, if at block 188 it is determined that a cached version of the selected result is available in cache 110, then data retrieval application 114 loads the cached version and displays it for user 120 through user interface component 112. This is indicated by block 192 in FIG. 2B. Providing the result (whether it is downloaded from the source or from the cache) is indicated by block 194 in FIG. 2B.

In one embodiment, this is not the end of the processing. It may be that the result ultimately displayed to user 120, itself, has hyperlinks in it. If it does, ranking module 104 identifies which (if any) of those hyperlinks is likely to be selected by user 120, and the underlying document can be cached. Even if the displayed result does not have hyperlinks in it, ranking module 104 can still predict the next type of data that will be accessed by the user, and this data can be cached. Examples may be helpful.

Assume, for instance, that the displayed result is a web-based dictionary page that, itself, has a plurality of different hyperlinks in it. An example user interface display of this type of result is shown in FIG. 2E discussed above. In that case, the displayed webpage can be provided to ranking module 104 which again estimates the most likely hyperlinks 179 on that displayed webpage that will be selected by the user. Of course, one of the hyperlinks can be the "back" button 181 indicating that the user will return to the original list of search results. In any case, based upon the characteristics 128 for user 120, ranking module 104 provides a list of the most likely hyperlinks that will be followed by the user from the displayed page. Asynchronous caching component 116 then accesses data store 108 to download the underlying source documents for those links and cache them in cache 110. This is indicated by blocks 196, 198 and 184 in FIG. 2B. This type of processing can continue so long as the page being displayed to the user has hyperlinks in it, no matter how deeply the user 120 navigates into the sequence of hyperlinks In another example, assume that data retrieval application 114 is a business data system that provides user 120 with access to business data records. One illustrative user interface display is shown in FIG. 2F discussed above. Assume that the initial results retrieved for the user show customer record 187 and aggregate customer sales totals 189 for a given customer identified in the business data system. This can be provided to ranking module 104. It may be that, based upon the personal characteristics 128 of user 120, ranking module 104 can estimate that the user is next most likely to ask for the regional sales figures for the same customer by actuating link 195. Even if this is not a hyperlink on the page currently displayed to the user (which shows aggregate sales figures for the customer) ranking module 104 may be able to predict that this is the next most likely result that user 120 will want to see. In that case, the identity of the likely next results needed 134, which is provided to asynchronous caching component 116, identifies the regional sales figures for the present customer. Asynchronous caching component 116 then accesses data store 108 (which in this case is a business data store) for those regional sales figures and stores them in cache 110. If the user next requests the regional sales figures for that customer, they can be quickly provided from cache 110, instead of from data store 108. Again, this type of processing can be continued for every display generated for user 120. That is, ranking module 104 can predict the next data that user 120 will want to display, based upon characteristics 128 retrieved for that user. This can significantly enhance the user experience by reducing latency. This can also increase the productively of a given worker.

Figure 3:
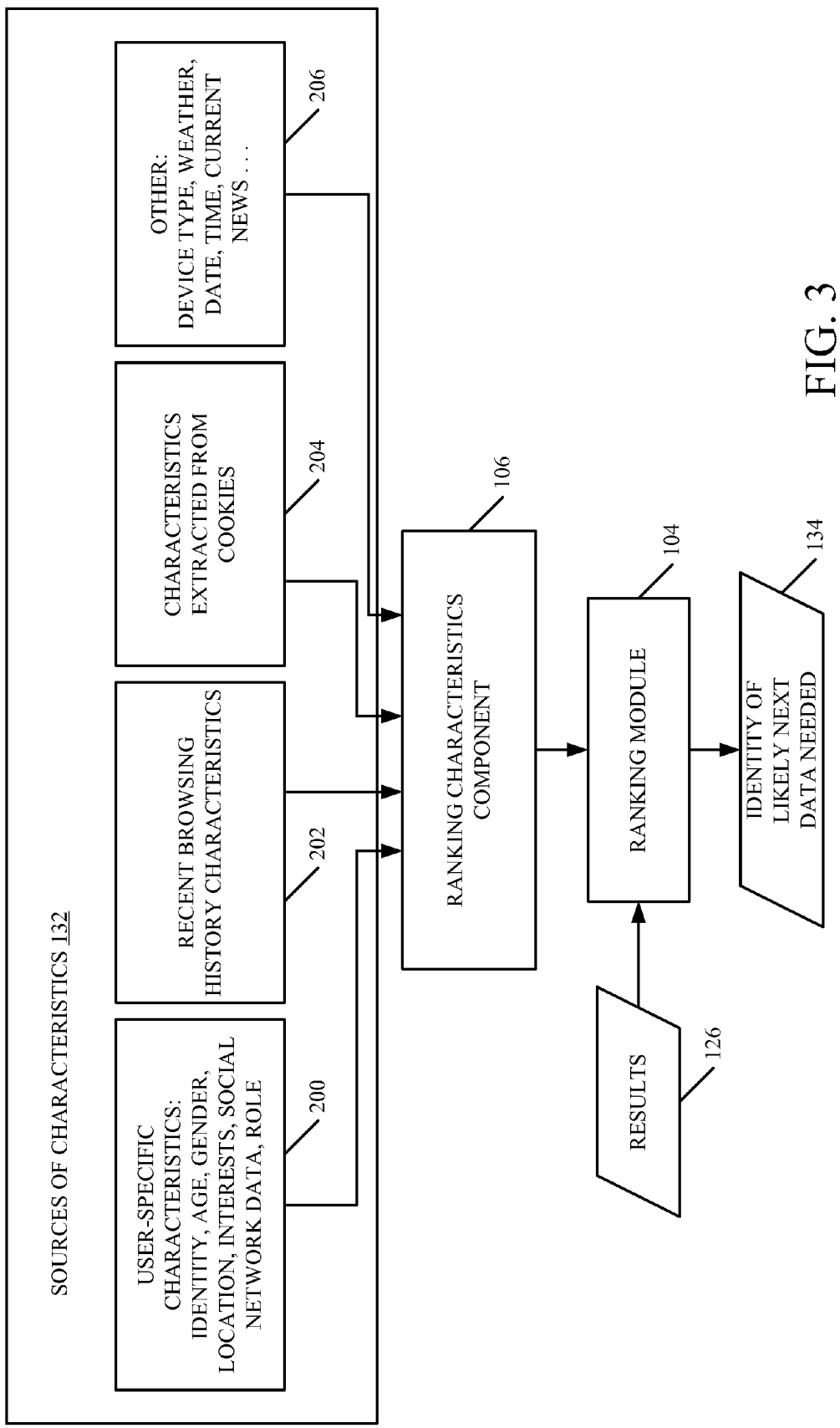
FIG. 3 is a block diagram showing sources of characteristics in more detail.

FIG. 3 is a block diagram illustrating one embodiment of the sources of characteristics 132 in more detail. In one embodiment, the sources 132 include user-specific characteristics 200, recent browsing history characteristics 202, characteristics extracted from cookies 204 and other characteristics 206. In the embodiment shown in FIG. 3, the user-specific characteristics include the identity of user 120, the user's age, gender, geographical location, interests, social network data and role. By way of example, the user's interests might be determined based on what other types of information the user has looked for in the recent past. For instance, the interests may be derived from the user's personal electronic mail messages or personal documents on the user's computer. By doing a subject matter analysis of those sources, the user's interests can be determined In addition, the user's social network data can be examined to find out the user's friends, interests, etc. All of this information can be used by ranking module 104 to determine what the user is likely to look for. Further, the user's role in a given company can be useful as well. For instance, if the user is a sales person, then the user may likely want to review sales data. On the other hand, if the user is a manager, the user may wish to review employee records or different types of information. Therefore, the user's role can be useful to ranking module 104 in predicting the identity of the likely next data that the user 120 will want to see.

Recent browsing history characteristics 202 can be obtained from the history stored on the user's browser. This indicates the websites that the user has recently visited, and this can also indicate the type of information the user will likely be looking for.

The characteristics extracted from cookies can include keywords or expressions that are associated with the user through the user's cookies. This information can also be useful in predicting the next information that the user is likely to want to see.

Finally, the other types of characteristics 206 can be a wide variety of different characteristics. They can include the user's device type, the current weather, the date, time, and current news, among others. For instance, ranking module 104 may determine that, if user 120 is using his or her mobile device (such as a smart phone or a tablet computer) user 120 is likely to be looking for different types of information than if the user is using his or her desktop computer. Similarly, if the user is searching during the business day, the user may well be looking for different types of data than if he or she is looking late at night. Further, the user may be looking for different types of information based upon the time of year (e.g., the date), the current weather, or current news stories that are happening. Of course, these are examples only.

Figure 3A:
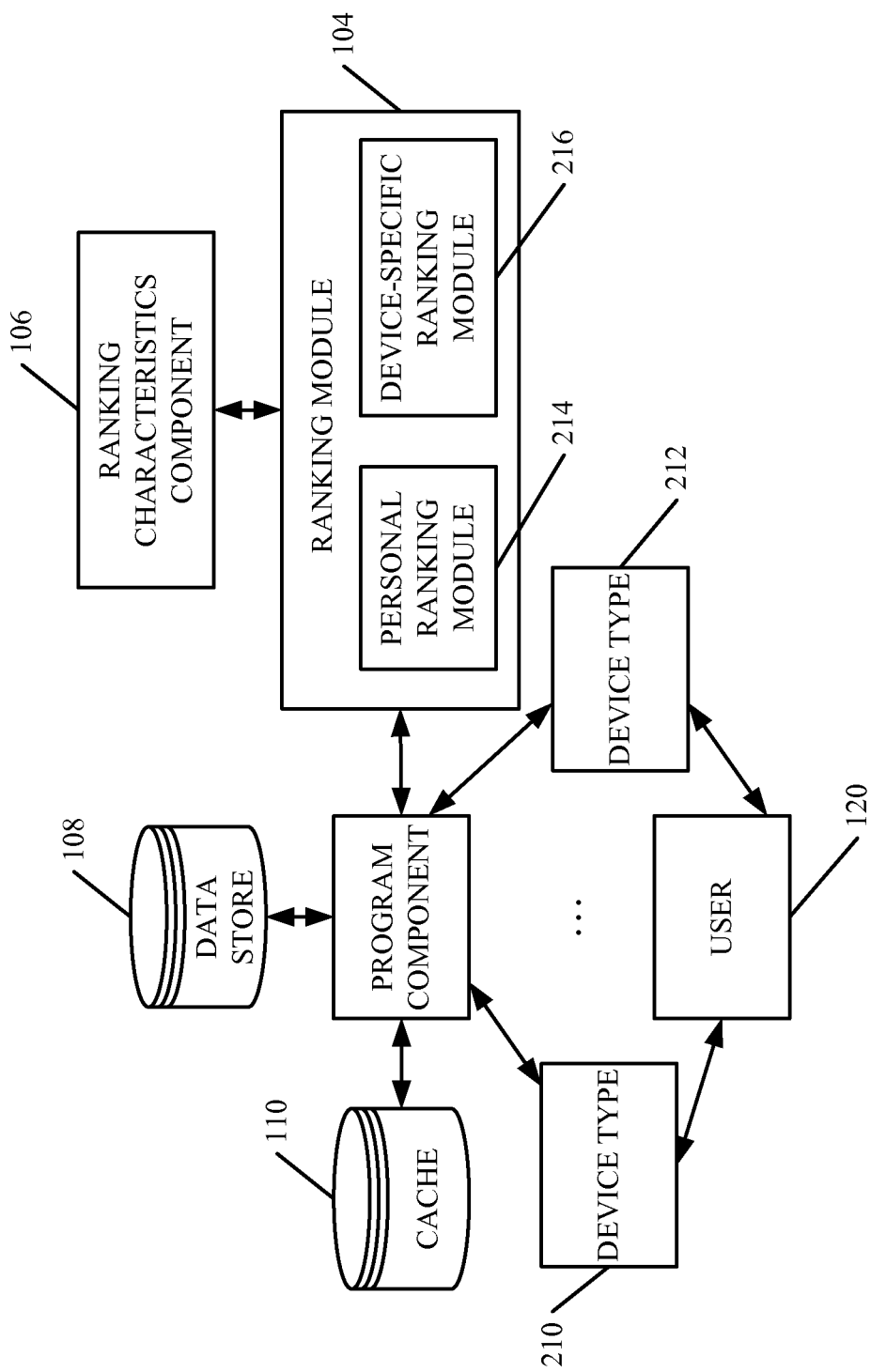
FIG. 3A shows various embodiments of ranking modules.

FIG. 3A shows another block diagram of system 100, and similar items are similarly numbered to those shown in FIG. 1. However, FIG. 3A shows that the ranking module 104 can have different implementations. For instance, it may be that user 120 has a plurality of different types of user devices 210-212 that the user uses. In one embodiment, ranking module 104 has a personal ranking module corresponding to user 120, regardless of the type of device that user 120 is using. For instance, the module 104 uses the same personal ranking module for user 120 to rank the next likely results regardless of whether the user 120 is using his or her laptop computer, or smart phone. This is indicated by personal ranking module 214. However, in another embodiment, ranking module 104 can deploy a device-specific ranking module for user 120. That is, ranking module 104 can use a different ranking module, and consider different characteristics, using a distinctly different ranking module, depending upon the type of device 210-212 that the user is currently using. Both of these types of systems are contemplated.

Figure 4:
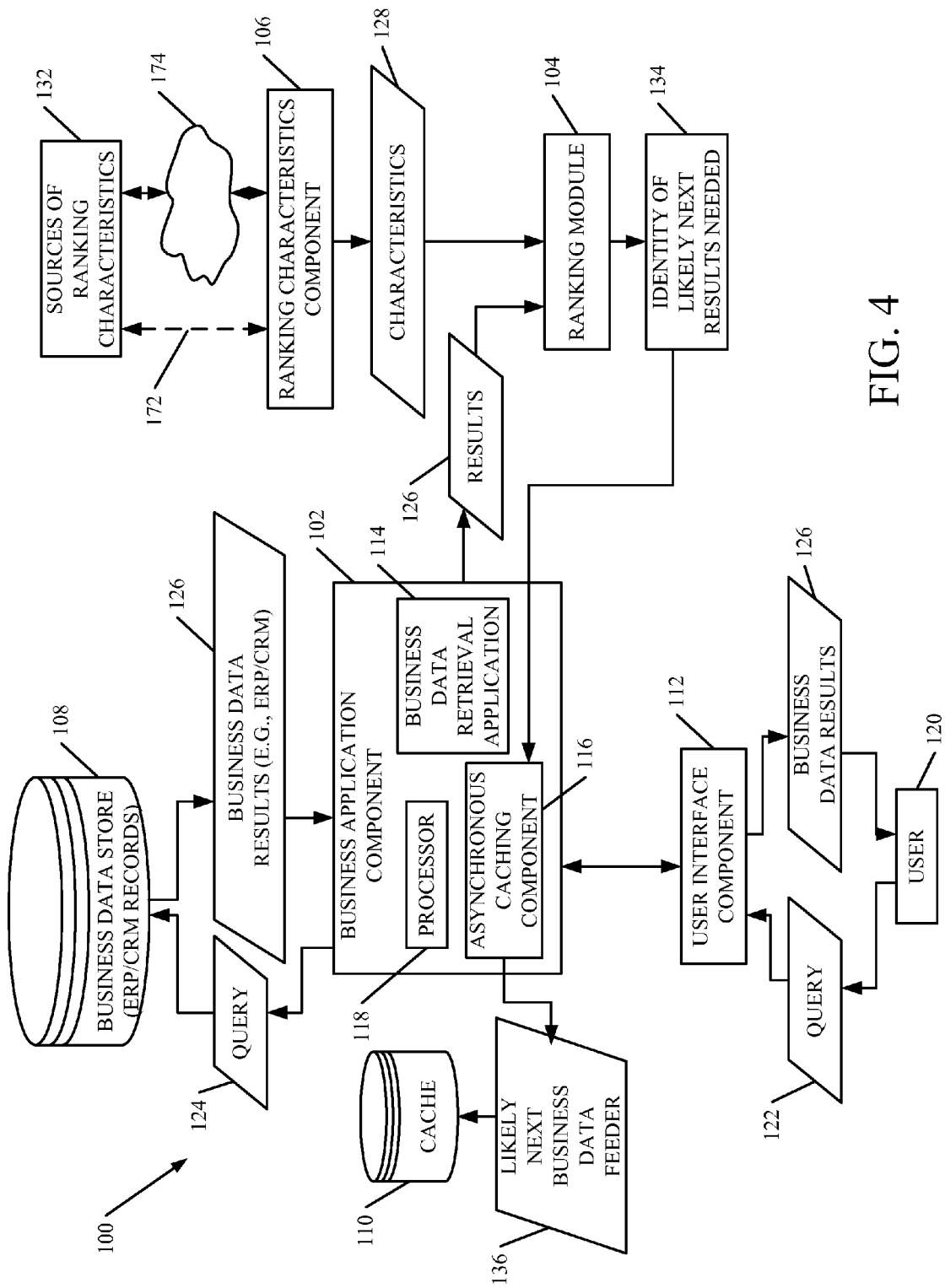
FIG. 4 is a block diagram of another embodiment of a data retrieval system.

FIG. 4 shows another embodiment of system 100. The elements are similar to those shown in FIG. 1, and are similarly numbered. However, FIG. 4 specifically shows that system 100 is deployed as a business data retrieval system. In that case, data store 108 stores business data (such as ERP/CRM data records) and user 120 is using business data retrieval application 114 to view that business data. Thus, the business data store 108 can store such records as customer records, account records, sales records, marketing information, human resources information, management information, sales prospect information and sales data and all other types of ERP/CRM business data records discussed above with respect to FIGS. 2A-2B. Ranking module 104 can estimate the next type of business data that user 120 wishes to see, based on the ranking characteristics associated with that user 120.

Figure 4B:
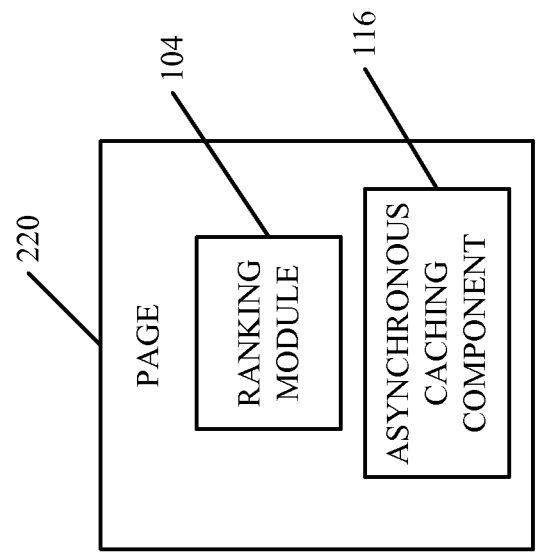
FIGS. 4A and 4B show various embodiments of deploying portions of the system within an application and within a webpage.
Figure 4A:
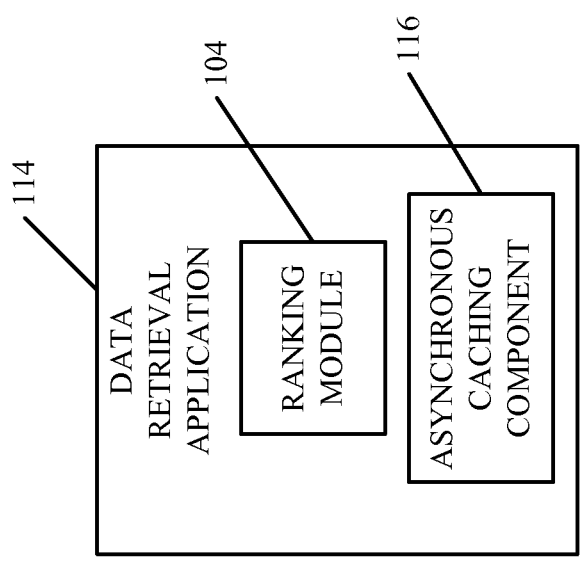

FIGS. 4A and 4B show two different embodiments for deploying the ranking module in asynchronous caching component 116. In the embodiment shown in FIG. 4A, ranking module 104 and asynchronous caching component 116 are embedded in data retrieval application 114. Therefore, assuming that data retrieval application 114 is a web browser, the functionality of ranking module 104 and asynchronous caching component 116 is embedded in the browser. If application 114 is a search engine, it is embedded in the search engine. If it is a business data retrieval application, it is embedded in that application.

However, FIG. 4B shows a different embodiment. In the embodiment shown in FIG. 4B, the functionality of ranking module 104 and asynchronous caching component 116 is actually embedded in a page 220 that is being displayed to the user. For instance, if page 220 is a webpage, then the ranking module 104 and asynchronous caching component 116 can be deployed in a webpage. By way of example, assume that page 220 is a page of an on-line shopping business. Assume that page 220 has a variety of different hyperlinks on it. In that case, ranking module 104 and asynchronous caching component 116 can operate on the links in that specific page 220. Of course other implementations can be used as well.

It should also be noted that, while FIGS. 1 and 4 show various components and systems, it should be noted that the functionality of those components can be combined in different ways. For example, the functionality of two or more components can be combined into a single component, or it can be divided out into additional components. Similarly, different portions of system 100 can be deployed in the cloud, can be server based, can be deployed on the user device, or combined in other ways as well. Those shown are for the sake of example only.

For instance, system 100 can be embodied in a cloud computing environment. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on a client device directly, or in other ways.

Figure 5:
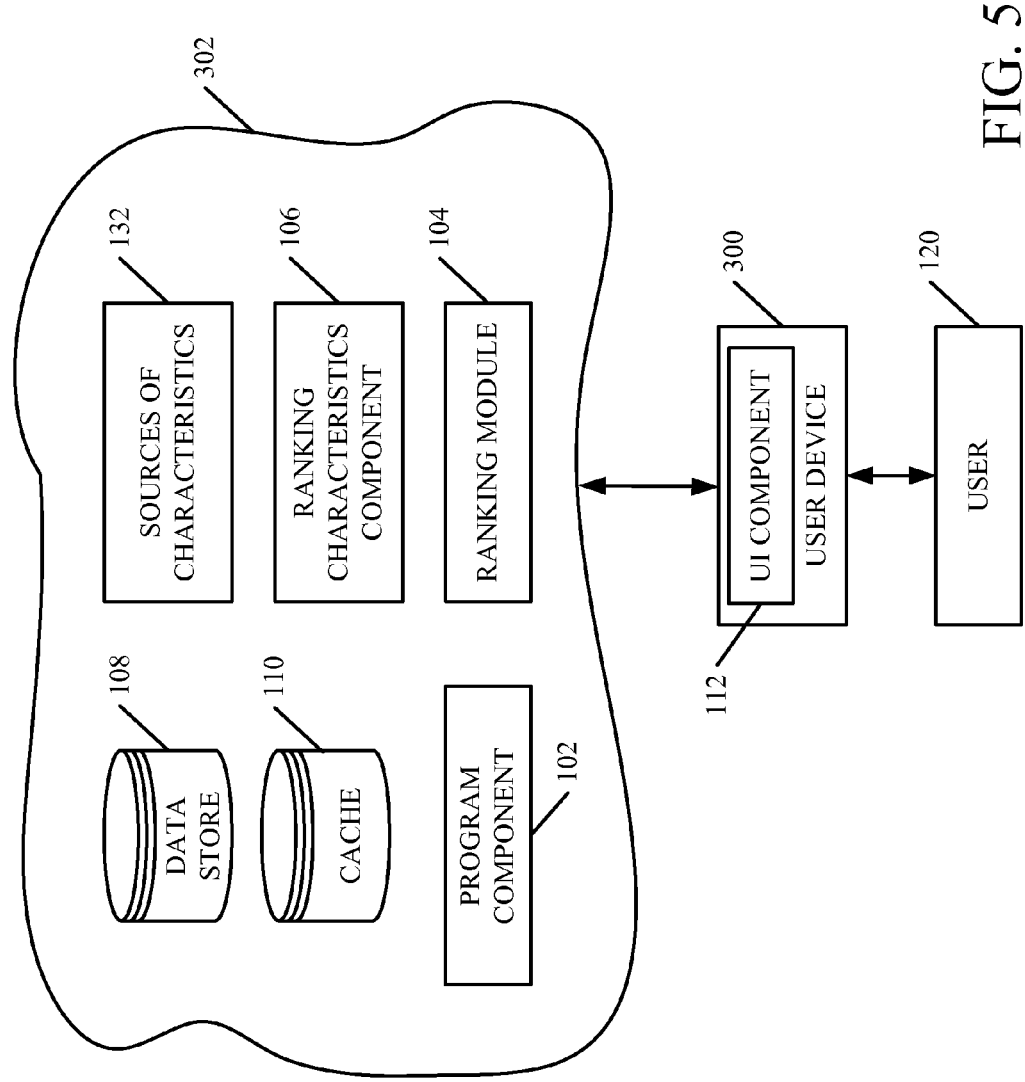
FIGS. 5 and 6 are block diagrams of the system deployed in cloud computing architectures.
Figure 6:
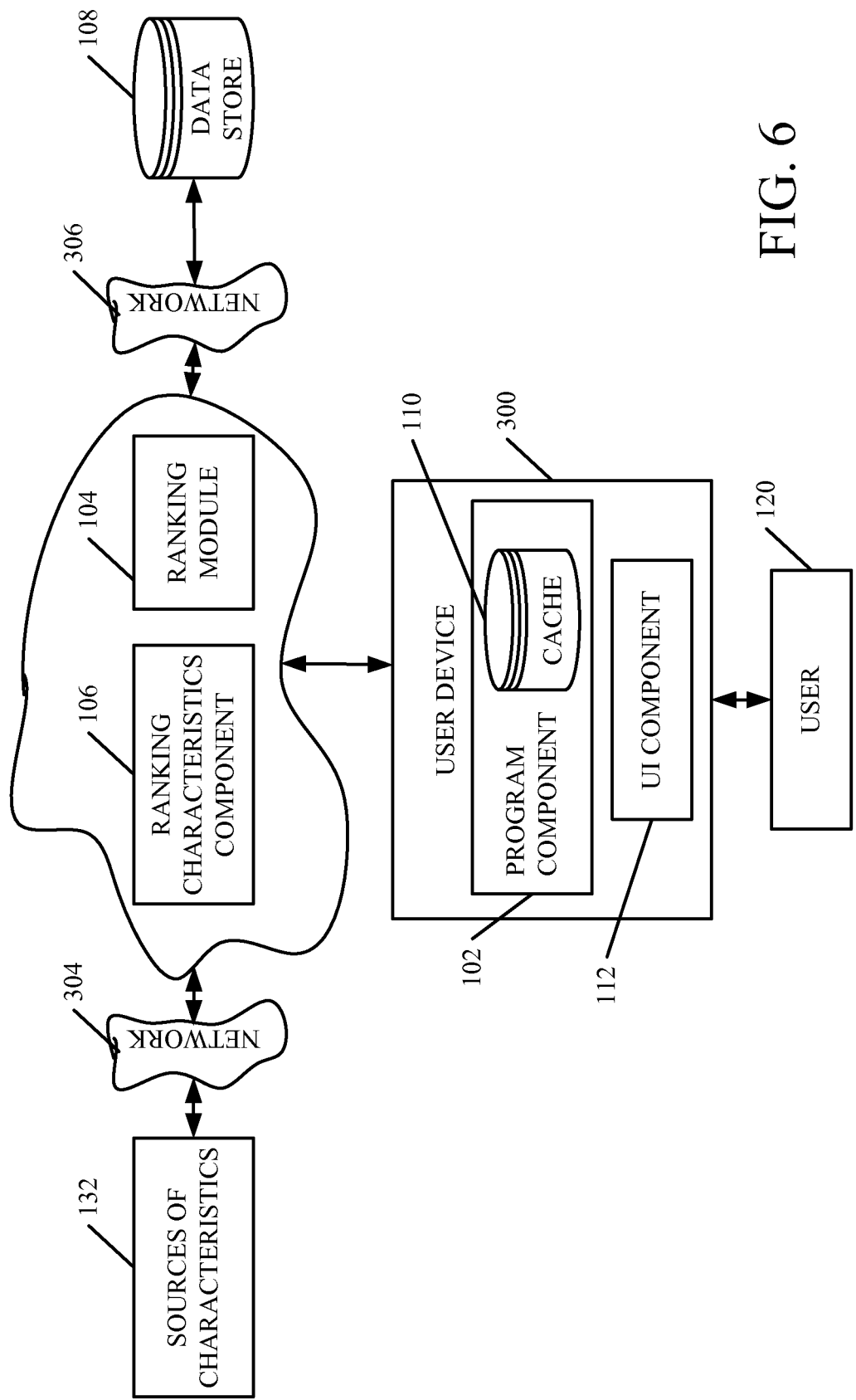

FIGS. 5 and 6 show two different embodiments of system 100 deployed in a cloud architecture. In FIG. 5, it can be seen that user 120 interacts with services in cloud 302 through user device 300 that includes user interface component 112. In the embodiment shown in FIG. 5, program component 102, ranking module 104, ranking characteristics component 106, data store 108, cache 110 and sources of characteristics 132 are all deployed and offered as cloud-based services.

In FIG. 6, user device 300 is shown with user interface component 112 and program component 102 (that has cache 110 therein). In that embodiment, ranking characteristics component 106 and ranking module 104 are disposed in cloud 302, but sources of characteristics 132 are disposed elsewhere and accessed over network 304. Similarly, data store 108 is disposed elsewhere and accessed over network 306. Of course, networks 304 and 306 can be the same or different networks as well. FIGS. 5 and 6 thus show two exemplary embodiments.

Figure 7:
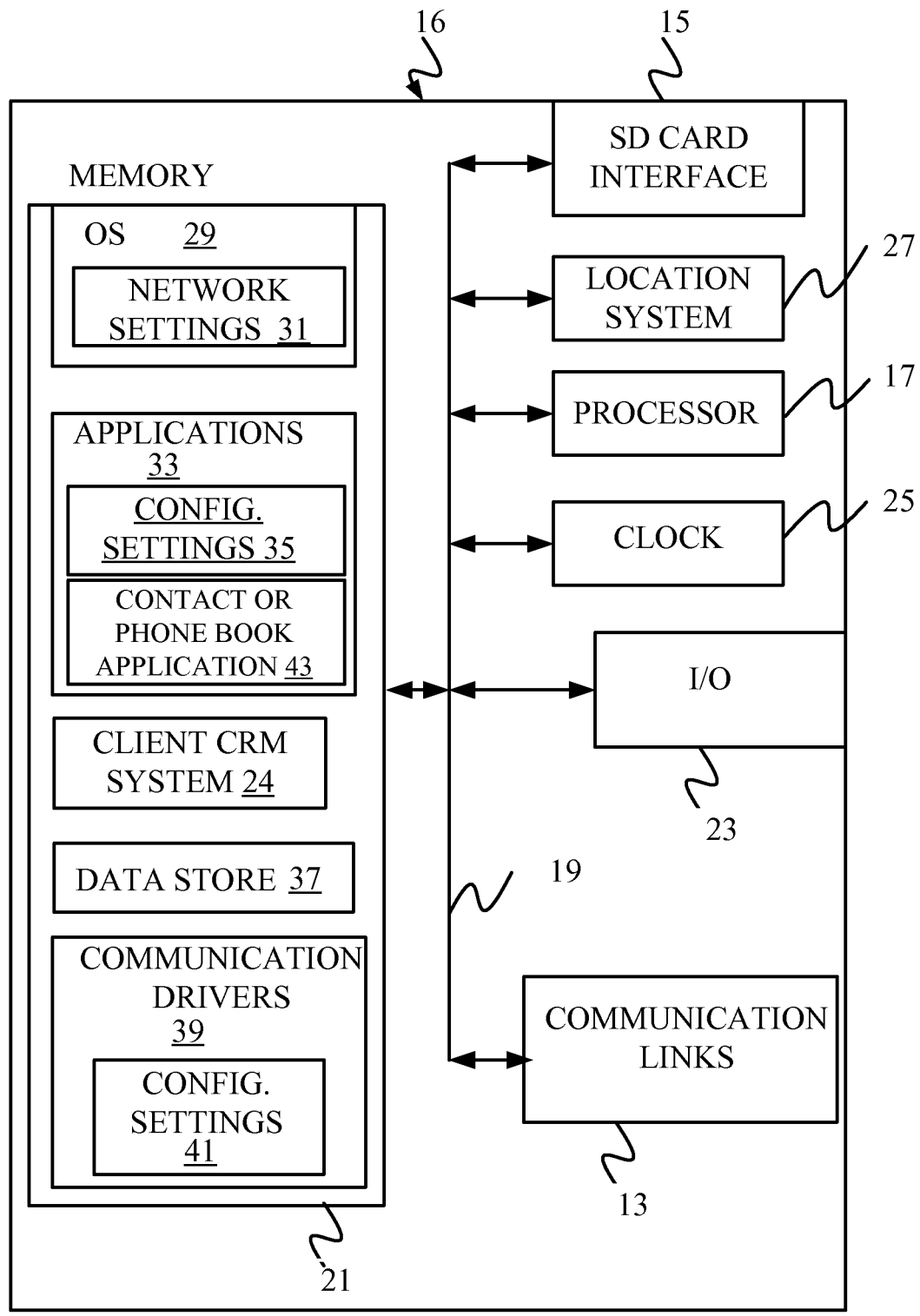
FIGS. 7-9 show various embodiments of mobile devices.
Figure 8:
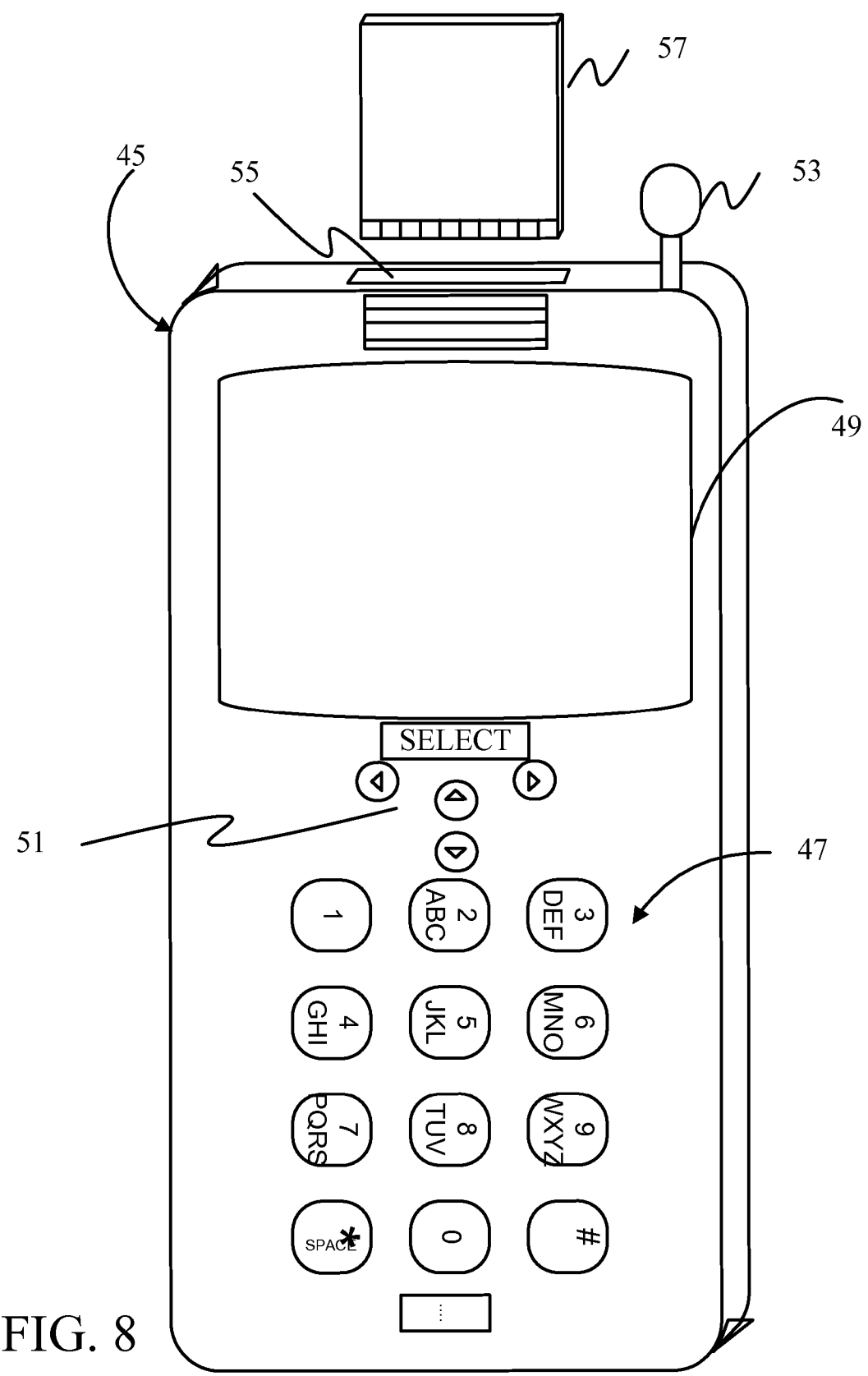
Figure 9:
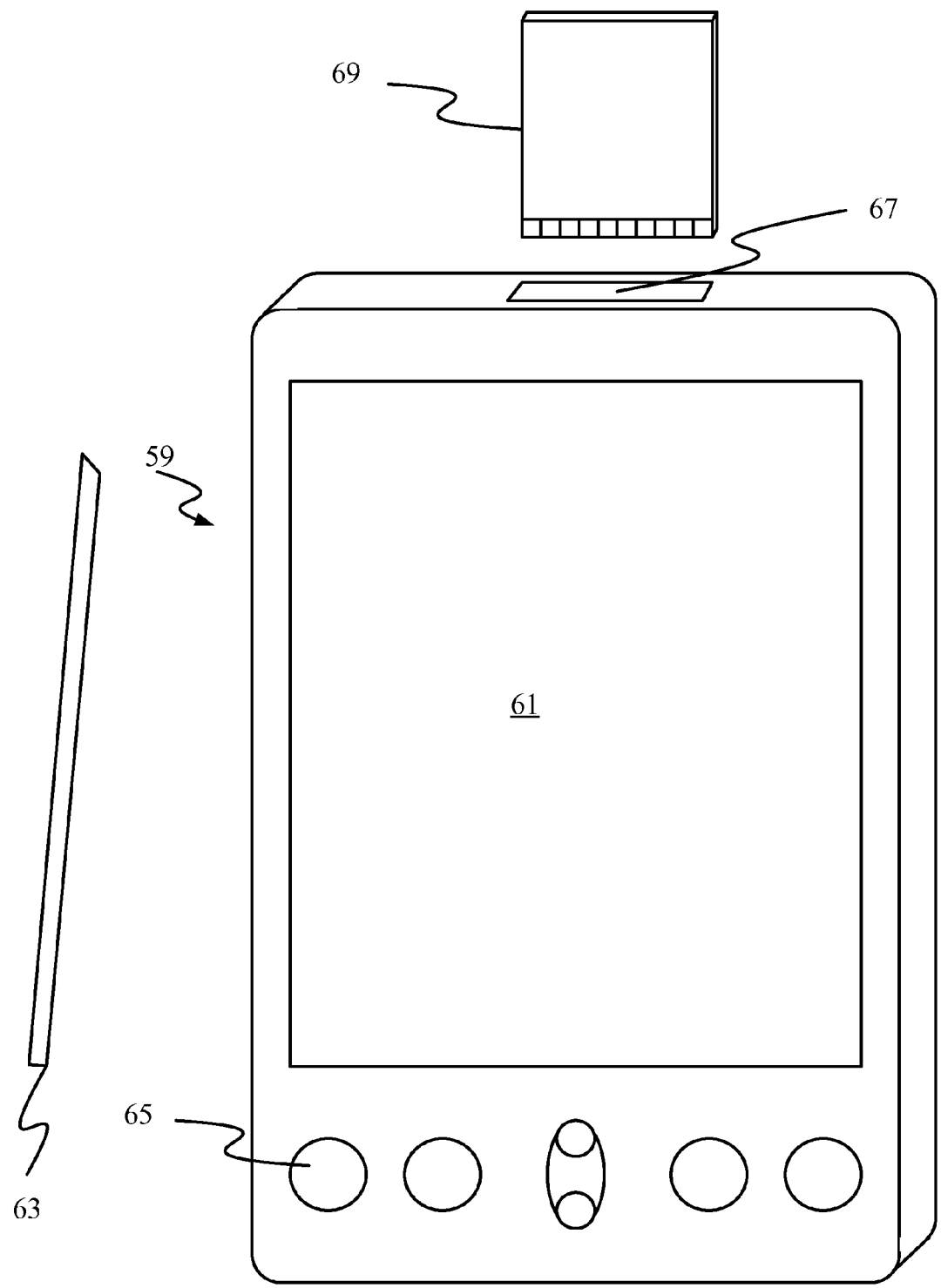

In any case, FIG. 7 is a simplified block diagram of one illustrative embodiment of a handheld or mobile computing device that can be used as user device 10 (which can be device 300 or another device in the above Figures), in which the present system can be deployed. FIGS. 8 and 9 are examples of handheld or mobile devices.

FIG. 7 provides a general block diagram of the components of a device 10 that can run components of system 100 or that interacts with system 100, or both. In the device 10, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), 1xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 14 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 10 can include input components such as buttons, touch sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 14.

Location system 27 illustratively includes a component that outputs a current geographical location of device 10. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 9, network settings 11, applications 43, application configuration settings 35, data store 37, communication drivers 39, and communication configuration settings 7. Memory 21 can include all types of tangible volatile and non-volatile computer-readable memory devices. It can also include computer storage media (described below). Memory 21 stores computer readable instructions that, when executed by processor 14, cause the processor to perform computer-implemented steps or functions according to the instructions. Drawing program 12, or other items for example, can reside in memory 21. Processor 14 can be activated by other components to facilitate their functionality as well.

Examples of the network settings 7 include things such as proxy information, Internet connection information, and mappings. Application configuration settings 7 include settings that tailor the application for a specific enterprise or user. Communication configuration settings 41 provide parameters for communicating with other computers and include items such as GPRS parameters, SMS parameters, connection user names and passwords.

Applications 43 can be applications that have previously been stored on the device 10 or applications that are installed during use, although these can be part of operating system 9, or hosted external to device 10, as well.

FIGS. 8 and 9 provide examples of devices 10 that can be used, although others can be used as well. In FIG. 8, a smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1xrtt, and Short Message Service (SMS) signals. In some embodiments, phone 45 also includes a Secure Digital (SD) card slot 55 that accepts a SD card 57.

The mobile device of FIG. 9 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Note that other forms of the devices 10 are possible. Examples include tablet computing devices, music or video players, and other handheld computing devices.

Figure 10:
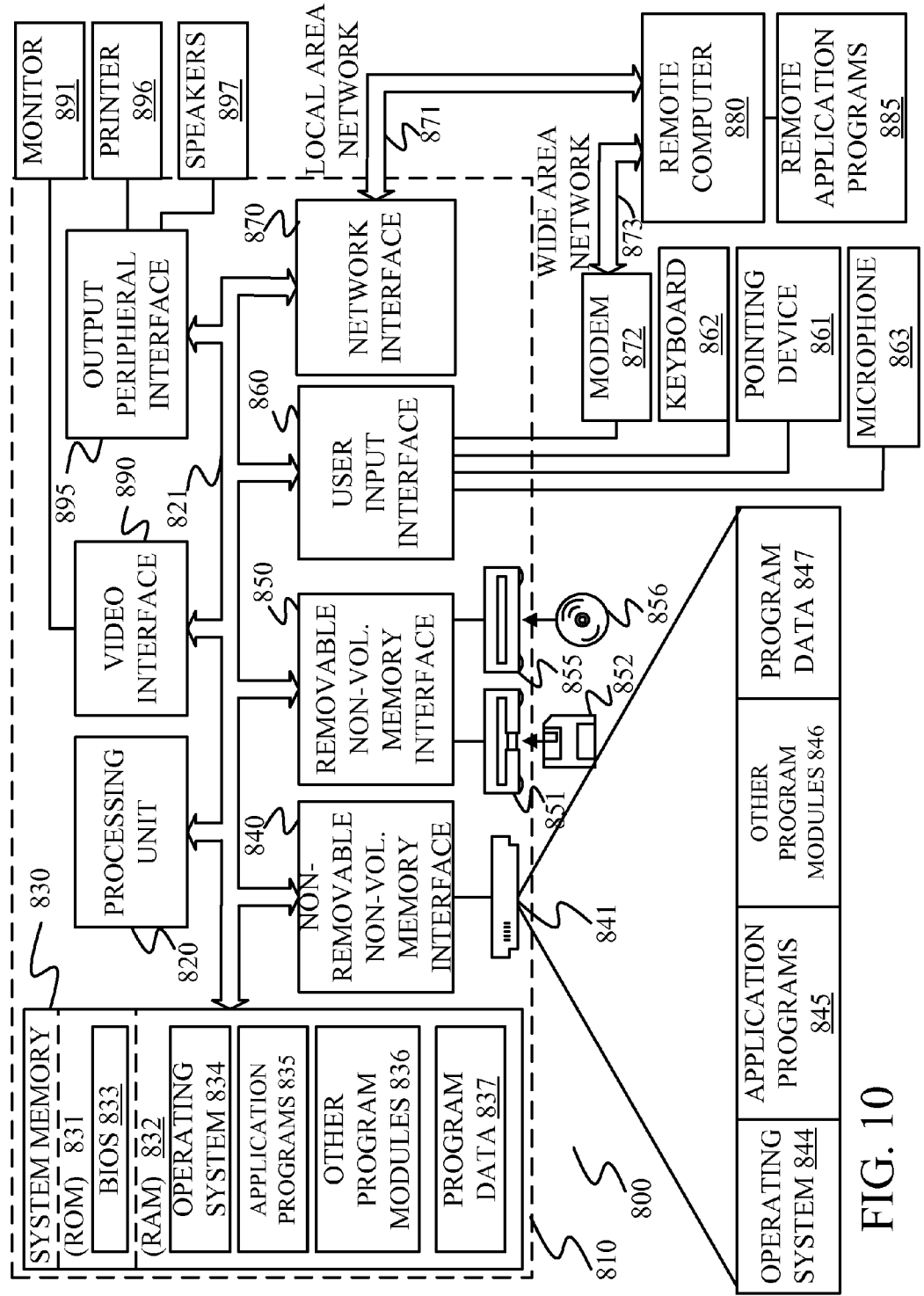
FIG. 10 is a block diagram of one embodiment of a computing environment.

FIG. 10 is one embodiment of a computing environment in which system 100 (for example) can be deployed. With reference to FIG. 10, an exemplary system for implementing some embodiments includes a general-purpose computing device in the form of a computer 810. Components of computer 810 may include, but are not limited to, a processing unit 820 (which can be processor 118), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. They can also include search components 802 and 804.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of retrieving data, comprising:
    accessing one or more sources to identify a set of user-specific characteristics, that are specific to a given user;
    defining a user-specific ranking module for the given user based on the set of user-specific characteristics;
    receiving a request for data results, the request for data results being separate from the set of user-specific characteristics;
    obtaining a set of data results based on the request;
    instructing a display device to display a set of user-selectable user interface elements, each user interface element corresponding to one of the data results and being selectable to obtain underlying data corresponding to the data result; and
    after instructing the display device to display the set of user-selectable user interface elements, but prior to receiving selection of a particular one of the user interface elements:
        ranking the set of data results using the user-specific ranking module, wherein the set of data results are ranked based in content comparison between the user-specific characteristics and the underlying data corresponding to the data results;
        selecting, from the ranked set of data results, a most highly ranked subset of the data results; and
        caching, for later retrieval, underlying data corresponding to the most highly ranked subset of the data results, wherein caching comprises storing, in a cache, the underlying data corresponding to some, but not all, of the data results.

2. The computer-implemented method of claim 1 and further comprising:
    receiving an indication of a user selection input;
    based on the indication of the user selection input, selecting the particular user interface element; and
    determining whether the underlying data corresponding to the selected user interface element is cached.

3. The computer-implemented method of claim 2 and further comprising:
    if the underlying data corresponding to the selected user interface element is cached, loading the underlying data, from the cache, for display on a user interface component; and
    otherwise, loading the underlying data from a data source that stores the underlying data.

4. The computer-implemented method of claim 3 wherein the underlying data corresponding to the selected user interface element has a second set of user-selectable user interface elements, each user interface element in the second set of user interface elements corresponding to underlying data and being selectable to obtain the corresponding, underlying data, the method comprising:
    prior to receiving selection of a particular user interface element from the second set of user interlace elements, accessing a ran module sort the second set of user interface elements, based on user-specific characteristics, in order of how likely the user is select each of the user interface elements in the second set; and
    caching, for later retrieval, data corresponding to a most highly ranked subset of the second set of user interface elements.

5. The computer-implemented method of claim 3 wherein receiving a request for data results comprises:
    receiving input parameters in a business data application, the input parameters indicating business data records to be retrieved.

6. The computer-implemented method of claim 5 wherein each element in the set of user-selectable user interface elements is configured to be actuated by the user to obtain business data records from a business data store, and further comprising:
    identifying, based on the user-specific characteristics, a business data record that does not correspond to any of the displaying user interface elements in the set of user-selectable user interface elements; and
    caching, for later retrieval, underlying data corresponding to the identified business data record.

7. The computer-implemented method of claim 3 wherein receiving a request for data results comprises:
    receiving a search query in a search engine application, the search query indicating search results to be retrieved.

8. The computer-implemented method of claim 7 wherein each element in the set of user-selectable user interface elements comprises a user-selectable link that is configured to be actuated by the user to obtain search results from a search result data store.

9. The computer-implemented method of claim 3 wherein receiving a request for data results comprises:
    receiving a web browser input in a web browser application, the web browser input indicating web pages to be retrieved, wherein the set of user-selectable user interface elements comprises user-selectable links, each link being configured to be actuated by the user to obtain web pages from a web site data store.

10. The computer-implemented method of claim 1,
    wherein ranking the set of data results using the user-specific ranking module comprises:
        for each data result the set of data results,
            identifying first content of the data result and second content from the user-specific characteristics;
            performing a content comparison between the first content and the second content; and
            ranking the data result based on the content comparison performed between the first content and the second content.

11. The computer-implemented method of claim 1 wherein ranking comprises:
    sorting the set of data results based on a likelihood that the user will select each of the corresponding user interface elements.

12. The computer-implemented method of claim 1 wherein ranking comprises:
    comparing keywords to the words in the data results, the keywords being derived from one or more of a user-specific source, a web browser history corresponding to the user, and cookies corresponding to the user.

13. The computer-implemented method of claim 1 and further comprising:
    obtaining user-neutral characteristics from a user-neutral source comprising a time and date source, a news source, and a weather source; and
    ranking the set of data results based on the user-neutral characteristics.

14. The computer-implemented method of claim 1 wherein the request for data results is received from a first device of a first device type corresponding to the user and wherein accessing a ranking module comprises:
    accessing a ranking module specific to the first device corresponding to the user.

15. The computing system, of comprising:
at least one processor; and
memory storing instructions executable by the at least one processor, wherein the instructions configure the computing system to:
receive an indication of a data request from a user;
obtain a set of data results based on the indication of the data request;
generate a representation of a user interface display with a set of selectable result identifiers based on a display order for the data results, wherein each result identifier corresponds to one of the data results and is selectable to obtain source data corresponding to the data result;
rank the set of data results, having the display order in the user interface display, based on an analysis of the data results relative to at least one user-specific ranking characteristic that is identified separate from the data request;
select, from the ranked set of data results, a most highly ranked subset of the data results;
cache, for later retrieval for display on the user interface display, the source data corresponding to the most highly ranked subset of the data results, wherein the cashing component stores, in a cache, the source data corresponding to some, but not all, of the data results after display of the set of selectable result identifiers, but prior to selection of a particular on of the selectable result identifiers;
identify, based on the user-specific characteristics, a data record that does not correspond to any of the set of selectable result identifiers; and
cache, for later retrieval, data corresponding to the identified data record.

16. The computing system of claim 15 wherein the instructions configure the computing system to:
obtain the user-specific ranking characteristics from a plurality of different sources and provide the user-specific ranking characteristics to the ranking module.

17. The computing system of claim 15 wherein the ranking module comprises;
a plurality of different ranking modules, each specific to a different user device used by the user.

18. The computing system of claim 15, wherein the user-specific ranking characteristic comprises at least one of: a personal characteristic of the user, a recent browsing characteristic of the user, or a characteristic extracted from cookies associated with the user.

19. A computer-implemented method comprising:
receiving an indication of a user input from a user device;
identifying the user device as one of a plurality of different user devices associated with a particular user;
based on the user input, identifying a user request for data results;
obtaining a set of data results having a display order based on the user request;
based on the identification of the user device, selecting a ranking module from a plurality of different ranking modules, each different ranking module being specific to one of the different user devices associated with the particular user;
instructing a display device to display a user interface with asset of user-selectable user interface elements based on the display order, each user interface element corresponding to one of the data results and being selectable to obtain data corresponding to the data result;
based on the selected ranking module, ranking the set of data results to define a ranked order that is different than the display order; and
caching, for later retrieval, data corresponding to a most highly ranked subset of the data results in the ranked order, the subset comprising some, but not all, of the set of data results;
receiving an indication of a user selection input;
based on the indication of the user selection input, selecting a particular one of the user interface elements;
determining whether the data corresponding to the selected user interface element is cached;
if the data corresponding to the selected user interface element is cached, loading the data for display on a user interface component from cache; and
otherwise, loading the data from a data source that stores the data corresponding to the selected user interface element.

20. The computing system of claim 17, wherein the user-specific ranking characteristic comprises a personal characteristic of the user including at least one of:
the user's identity, the user's gender, the user's interests, or social network data associated with the user.

* * * * *